(12) United States Patent
Shimizu

(10) Patent No.: US 10,560,292 B1
(45) Date of Patent: Feb. 11, 2020

(54) TRANSMISSION APPARATUS AND COMMUNICATION SYSTEM

(71) Applicant: Toshiba Memory Corporation, Tokyo (JP)

(72) Inventor: Yutaka Shimizu, Yokohama Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

(21) Appl. No.: 16/285,974

(22) Filed: Feb. 26, 2019

(30) Foreign Application Priority Data

Sep. 19, 2018 (JP) ................. 2018-174598

(51) Int. Cl.
| | |
|---|---|
| H03K 7/02 | (2006.01) |
| H03K 9/02 | (2006.01) |
| H04L 25/03 | (2006.01) |
| H04L 27/156 | (2006.01) |
| H04L 25/49 | (2006.01) |
| H04L 7/033 | (2006.01) |

(52) U.S. Cl.
CPC ........ H04L 25/03853 (2013.01); H04L 7/033 (2013.01); H04L 25/03847 (2013.01); H04L 25/4902 (2013.01); H04L 27/156 (2013.01)

(58) Field of Classification Search
CPC ............. H04L 25/03853; H04L 27/156; H04L 25/03847; H04L 25/4902; H04L 7/033; H04L 7/0331; H04L 27/04; G11C 7/10; G11B 20/10009; H04B 10/5161; H03M 1/682
USPC ................................ 375/353, 296
See application file for complete search history.

(56) References Cited

U.S. PATENT DOCUMENTS

| | | | |
|---|---|---|---|
| 9,742,498 B1 * | 8/2017 | Nagarajan | ............. H03M 1/682 |
| 10,177,903 B1 * | 1/2019 | Toi | ........................ H04L 7/0331 |
| 2008/0056342 A1 * | 3/2008 | Fujuda | ............. G11B 20/10009 |
| | | | 375/231 |
| 2014/0169429 A1 | 6/2014 | Ran | |
| 2016/0301480 A1 | 10/2016 | Ide | |
| 2017/0063466 A1 * | 3/2017 | Wang | ................. H04B 10/5161 |
| 2019/0044768 A1 * | 2/2019 | Kim | ........................ H04L 27/04 |
| 2019/0215202 A1 * | 7/2019 | Hollis | ....................... G11C 7/10 |

FOREIGN PATENT DOCUMENTS

| | | |
|---|---|---|
| JP | 2016-136728 A | 7/2016 |
| JP | 2016-201736 A | 12/2016 |
| JP | 6227733 B1 | 11/2017 |

* cited by examiner

*Primary Examiner* — Phuong Phu
(74) *Attorney, Agent, or Firm* — Kim & Stewart LLP

(57) ABSTRACT

A transmission apparatus includes a waveform processing circuit. The waveform processing circuit is configured to receive a modulated signal indicating each of values of pulses by one of four signal levels including first, second, third, and fourth signal levels ascending in this order. The waveform processing circuit is configured to output a signal corresponding to the modulated signal. A portion of the output signal corresponding to a portion of the modulated signal that transitions between the first and fourth signal levels, transitions between a first adjusted signal level different from the first signal level and a second adjusted signal level different from the fourth signal level. The transmission apparatus is configured to transmit a signal corresponding to the signal output from the waveform processing circuit through a wired communication path.

20 Claims, 14 Drawing Sheets

FIG. 3A

| INPUT | | OUTPUT |
|---|---|---|
| MAIN<1:0> | PRE<1:0> | BOOST_PRE |
| 00 | 11 | 1 |
| 11 | 00 | 1 |
| OTHER THAN ABOVE | | 0 |

FIG. 3B

| INPUT | | OUTPUT |
|---|---|---|
| POST<1:0> | MAIN<1:0> | BOOST_POST |
| 00 | 11 | 1 |
| 11 | 00 | 1 |
| OTHER THAN ABOVE | | 0 |

FIG. 4

| INPUT | | | OUTPUT |
|---|---|---|---|
| DM<1:0> | BOOST_PRE | BOOST_POST | VOUT |
| 00 | 1 | 1 | $-V_o - 2 \times V_b$ |
| 00 | 1 | 0 | $-V_o - V_b$ |
| 00 | 0 | 1 | $-V_o - V_b$ |
| 00 | 0 | 0 | $-V_o$ |
| 01 | X | X | $-\frac{1}{3} \times V_o$ |
| 10 | X | X | $\frac{1}{3} \times V_o$ |
| 11 | 0 | 0 | $V_o$ |
| 11 | 0 | 1 | $V_o + V_b$ |
| 11 | 1 | 0 | $V_o + V_b$ |
| 11 | 1 | 1 | $V_o + 2 \times V_b$ |

FIG. 9

| INPUT | | | OUTPUT |
|---|---|---|---|
| MAIN<1:0> | BOOST_PRE | BOOST_POST | VOUT |
| 00 | 1 | X | $-V_o-V_b$ |
| 00 | X | 1 | |
| 00 | 0 | 0 | $-V_o$ |
| 01 | X | X | $-\frac{1}{3} \times V_o$ |
| 10 | X | X | $\frac{1}{3} \times V_o$ |
| 11 | 0 | 0 | $V_o$ |
| 11 | X | 1 | $V_o+V_b$ |
| 11 | 1 | X | |

FIG. 13

| INPUT | | OUTPUT |
|---|---|---|
| PRE<1:0> | MAIN<1:0> | SEL |
| 00 | 00 | 3 |
| 00 | 01 | 1 |
| 00 | 10 | 2 |
| 00 | 11 | 3 |
| 01 | 00 | 5 |
| 01 | 01 | 3 |
| 01 | 10 | 3 |
| 01 | 11 | 4 |
| 10 | 00 | 4 |
| 10 | 01 | 3 |
| 10 | 10 | 3 |
| 10 | 11 | 5 |
| 11 | 00 | 3 |
| 11 | 01 | 2 |
| 11 | 10 | 1 |
| 11 | 11 | 3 |

FIG. 14
| INPUT | OUTPUT |
|---|---|
| DM<1:0> | VOUT |
| 00 | $-V_o$ |
| 01 | $-\frac{1}{3} \times V_o$ |
| 10 | $\frac{1}{3} \times V_o$ |
| 11 | $V_o$ |
FIG. 15A
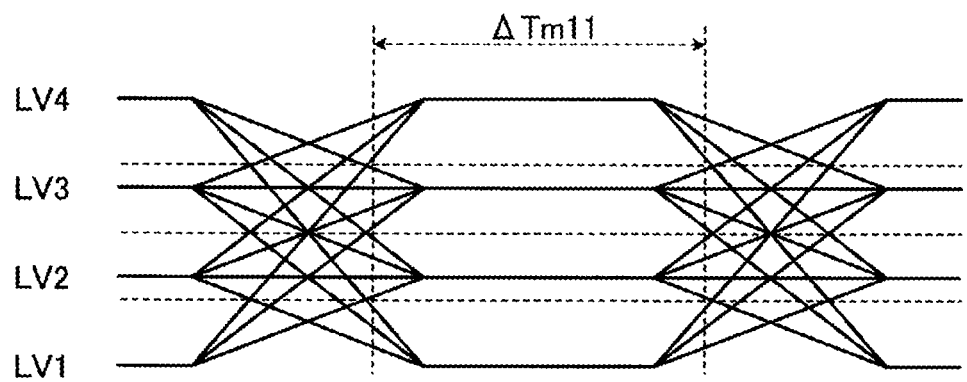
FIG. 15B
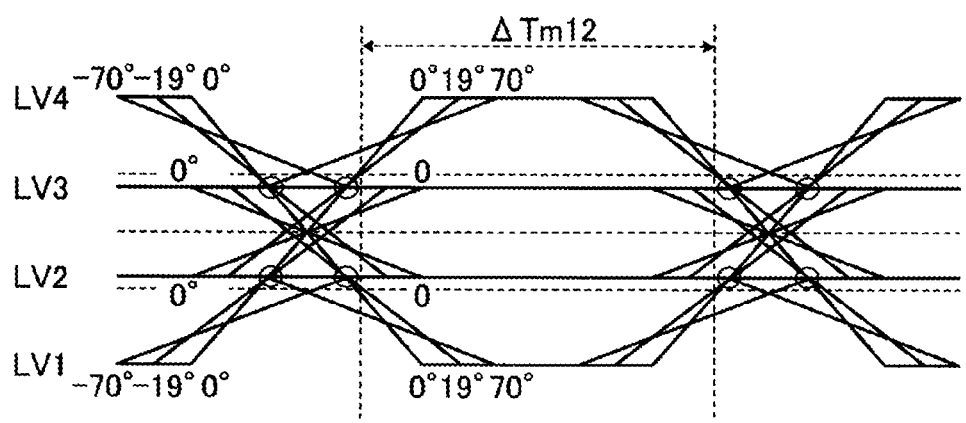

TRANSMISSION APPARATUS AND COMMUNICATION SYSTEM

CROSS-REFERENCE TO RELATED APPLICATION

This application is based upon and claims the benefit of priority from Japanese Patent Application No. 2018-174598, filed on Sep. 19, 2018, the entire contents of which are incorporated herein by reference.

FIELD

Embodiments described herein relate generally to a transmission apparatus and a communication system.

BACKGROUND

In a communication system, a transmission apparatus may be connected to a reception apparatus through a wired communication path and wired communication may be performed. In this case, it is desired that the wired communication is performed with a high quality.

DESCRIPTION OF THE DRAWINGS

FIGS. 3A and 3B are tables illustrating data structures of adjustment information in the first embodiment.

FIG. 4 is a table illustrating a data structure of conversion information in the first embodiment.

FIG. 9 is a table illustrating a data structure of conversion information in the modification example of the first embodiment.

FIG. 13 is a table illustrating a data structure of adjustment information in the second embodiment.

FIG. 14 is a table illustrating a data structure of conversion information in the second embodiment.

FIGS. 15A and 15B are diagrams illustrating eye patterns of a transmission signal in the second embodiment.

DETAILED DESCRIPTION

Embodiments provide a transmission apparatus and a communication system, in which it is possible to perform wired communication with a high quality.

In general, according to an embodiment, a transmission apparatus includes a waveform processing circuit that is configured to receive a modulated signal indicating each of values of pulses by one of four signal levels including a first signal level, a second signal level higher than the first signal level, a third signal level higher than the second signal level, and a fourth signal level higher than the third signal level, output a signal corresponding to the modulated signal. A portion of the output signal corresponding to a portion of the modulated signal that transitions between the first and fourth signal levels, transitions between a first adjusted signal level different from the first signal level and a second adjusted signal level different from the fourth signal level. In addition, the transmission apparatus is configured to transmit a signal corresponding to the signal output from the waveform processing circuit through a wired communication path.

A waveform processing circuit, which is implemented in a transmission apparatus and a communication system according to the embodiments, will be described with reference to the accompanying drawings. The present disclosure is not limited to the embodiments.

First Embodiment

Figure 1:
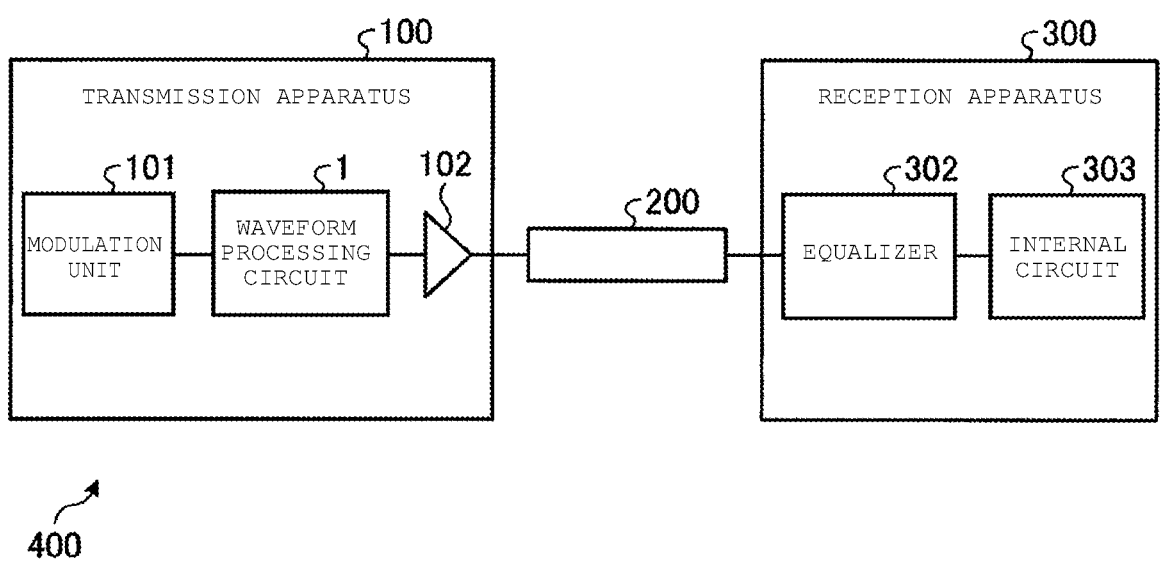
FIG. 1 is a diagram illustrating a configuration of a communication system including a transmission apparatus according to a first embodiment.

A transmission apparatus according to a first embodiment is implemented in a communication system in which wired communication is performed. Specifically, a transmission apparatus 100 may be included in, for example, a communication system 400 as illustrated in FIG. 1. FIG. 1 is a block diagram illustrating a configuration of the communication system 400 including the transmission apparatus 100.

The communication system 400 includes the transmission apparatus 100, a wired transmission path (a wired communication path) 200, and a reception apparatus 300. The transmission apparatus 100 and the reception apparatus 300 are communicably connected through the wired transmission path 200. The transmission apparatus 100 generates a modulated signal, which is acquired by performing pulse amplitude modulation on transmission data, and transmits the modulated signal to the reception apparatus 300 through the wired transmission path 200. The reception apparatus 300 includes an equalizer 302 and an internal circuit 303. In order to receive the modulated signal from the transmission apparatus 100 through the wired transmission path 200, the reception apparatus 300 equalizes attenuation of a signal due to the transmission path 200 using the equalizer 302, and supplies the equalized signal to the internal circuit 303. The internal circuit 303 may restore the transmission data based on the modulated signal and may perform a prescribed operation using the restored data.

Figure 6A:
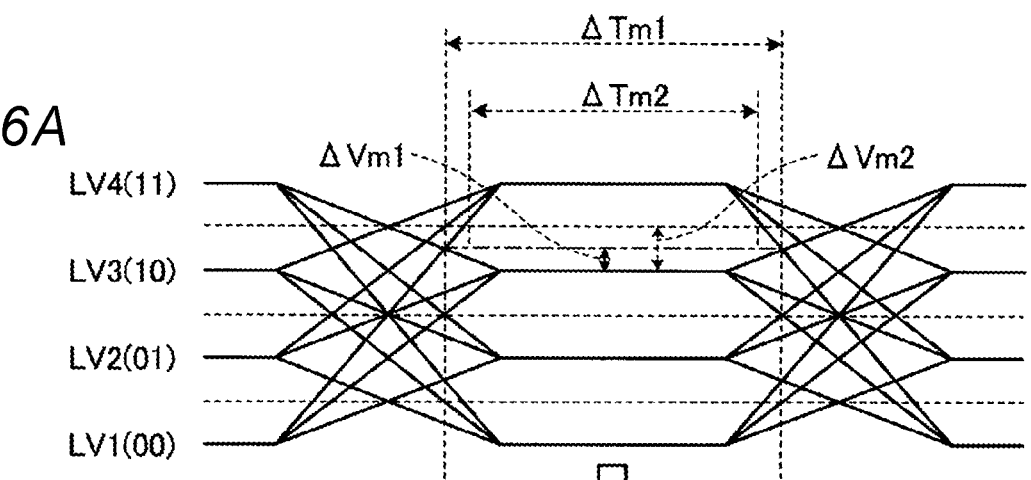
FIGS. 6A and 6B are diagrams illustrating eye patterns of the transmission signal in the first embodiment.

For example, in a case where the modulated signal is a pulse amplitude modulation 4 (PAM4) signal corresponding to a two-bit bit pattern, the modulated signal may acquire four signal levels LV1 to LV4 (refer to FIG. 6A). For example, a signal level (first signal level) LV1 indicates a bit pattern "00". A signal level (third signal level) LV2 indicates a bit pattern "01". A signal level (fourth signal level) LV3 indicates a bit pattern "10". A signal level (second signal level) LV4 indicates a bit pattern "11".

A reception waveform of the PAM4 signal in the reception apparatus 300 is affected by decrease in a slew rate due to attenuation of harmonic wave components, and thus there is a tendency that a voltage which has a maximum time margin is different from a voltage which has a maximum amplitude margin in an eye pattern between the signal level LV1 and the signal level LV4 which corresponds to a maximum transition width. The time margin indicates a range of a margin of time in which it is possible to appropriately restore data from the signal level in the reception waveform. The amplitude margin indicates a range of a margin of an amplitude in which it is possible to appropriately restore data from the signal level in the reception waveform. There may be a possibility that the time margin becomes narrow when conforming to a maximum amplitude margin value, and there may be a possibility that the amplitude margin becomes narrow when conforming to a time maximum margin value.

Here, in the present embodiment, in responding to a transition between the signal levels which correspond to the maximum transition width being detected, the transmission apparatus 100 generates a transmission signal, in which signal levels before and after the transition are changed, thereby compatibly securing the amplitude margin and the time margin in the reception apparatus 300 which receives the transmission signal.

Specifically, when the transmission apparatus detects a transition pattern corresponding to the maximum transition width in the modulated signal (for example, the PAM4 signal), the signal levels before and after the detected transition are changed. For example, in the four signal levels LV1 to LV4, the minimum signal level LV1 is lowered or the maximum signal level LV4 is raised. Therefore, in the eye pattern between the signal level LV1 and the signal level LV4 corresponding to the maximum transition width, it is possible to enlarge the time margin when conforming to the maximum amplitude margin value. That is, in the reception apparatus 300 which receives the signal, on which waveform processing is performed, through the wired transmission path 200, it is possible to widely secure an opening in the eye pattern between the signal level LV1 and the signal level LV4 which correspond to the maximum transition width, and it is possible to compatibly secure the amplitude margin and the time margin.

More specifically, as illustrated in FIG. 1, the transmission apparatus 100 includes a modulation unit 101, a waveform processing circuit 1, and an output driver 102 which drives a signal that is transmitted to the reception apparatus 300 via a transmission node (not shown) and the wired transmission path 200. The modulation unit 101 receives the transmission data, generates the modulated signal acquired by performing multi-value amplitude modulation on the transmission data, and supplies the modulated signal to the waveform processing circuit 1. The modulation unit 101 may be mounted as a circuit in hardware manner.

The waveform processing circuit 1 detects a transition pattern of the modulated signal. It is possible to detect the transition pattern by referring to the transmission data acquired before transition timing and the transmission data acquired after the transition timing. When the waveform processing circuit 1 detects the transition pattern corresponding to the maximum transition width, the waveform processing circuit 1 changes the signal levels before and after the detected transition timing.

When a pattern of signal level LV1→signal level LV4 is detected as the transition pattern corresponding to the maximum transition width, the waveform processing circuit 1 lowers the signal level LV1 and raises the signal level LV4. Otherwise, when a pattern of signal level LV4→signal level LV1 is detected as the transition pattern corresponding to the maximum transition width, the waveform processing circuit 1 raises the signal level LV4 and lowers the signal level LV1. It is possible to lower the signal level LV1 by reducing a control value of the signal level in a digital manner. It is possible to raise the signal level LV4 by adding the control value of the signal level in the digital manner.

Figure 2:
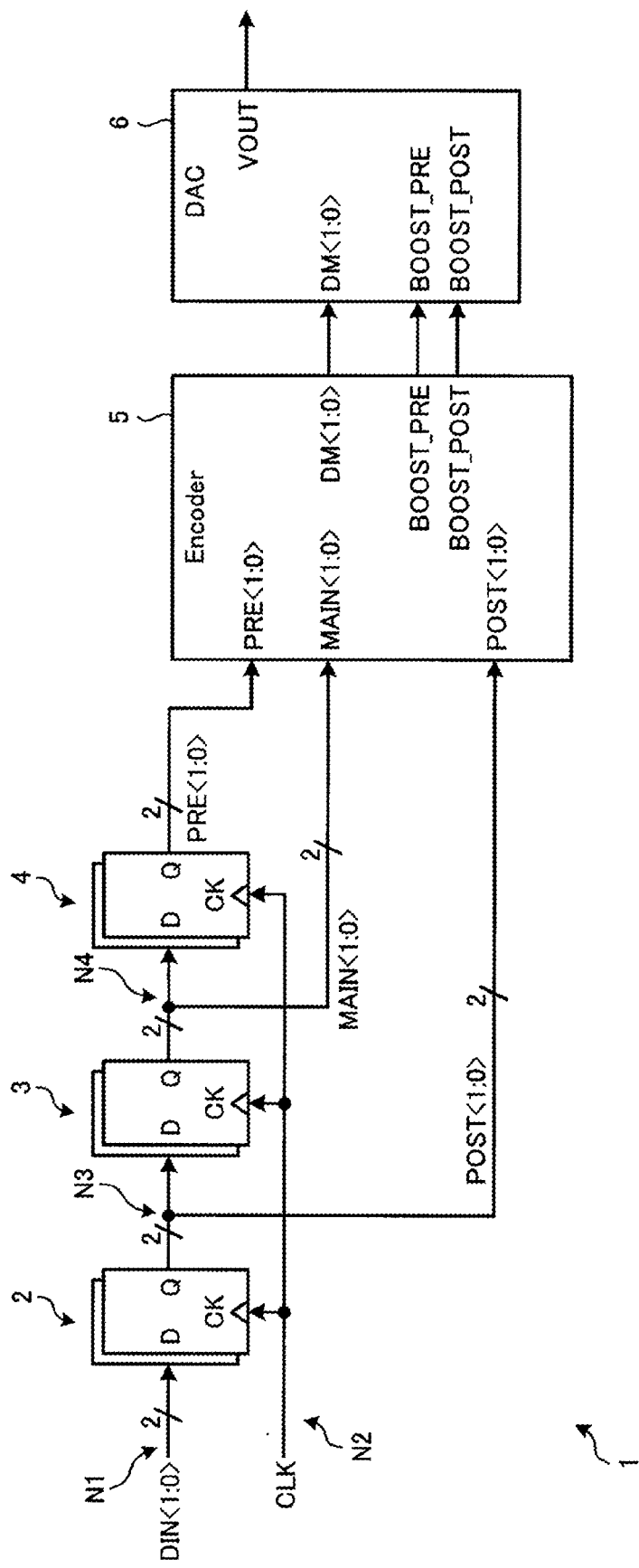
FIG. 2 is a diagram illustrating a configuration of a waveform processing circuit according to the first embodiment.

FIG. 2 is a diagram illustrating an example of a configuration of the waveform processing circuit 1.

The waveform processing circuit 1 includes a flip-flop circuit 2, a flip-flop circuit 3, a flip-flop circuit 4, an encoder 5, and a DA converter (DAC) 6.

The flip-flop circuit 2 includes a data input terminal D which is electrically connected to a node N1, a clock terminal CK which is electrically connected to a node N2, and an output terminal Q which is electrically connected to the flip-flop circuit 3 and the encoder 5 through a node N3. The node N1 is a data node, and the transmission data is supplied thereto from the modulation unit 101. The node N2 is a clock node, and a clock CLK, timing of which is adjusted, is supplied thereto from a clock generation circuit (which is not illustrated in the drawing).

The flip-flop circuit 3 includes a data input terminal D which is electrically connected to the flip-flop circuit through the node N3, a clock terminal CK which is electrically connected to the node N2, and an output terminal Q which is electrically connected to the flip-flop circuit 4 and the encoder 5 through a node N4.

The flip-flop circuit 4 includes a data input terminal D which is electrically connected to the flip-flop circuit through the node N4, a clock terminal CK which is electrically connected to the node N2, and an output terminal Q which is electrically connected to the encoder 5.

Each of the flip-flop circuits 2 to 4 is, for example, a two-bit flip-flop circuit. The flip-flop circuits 2 to 4 are connected in series and receive the common clock CLK, and may form a delay chain in which delay stages having a CLK cycle are connected in series. Outputs of the respective flip-flop circuits 2 to 4 are electrically connected to the encoder 5, and the encoder 5 may receive data in which delay amounts are different from each other.

The flip-flop circuit 2 may receive two-bit data DIN<1:0> through the node N1. The flip-flop circuit 2 outputs the data DIN<1:0>, acquired at a timing in which the clock CLK is switched H→L level, at a timing in which CLK is changed L→H, and supplies the data DIN<1:0> as data POST<1:0> to the flip-flop circuit 3 and the encoder 5 through the node N3. That is, the data POST<1:0> may be data which is acquired by delaying the data DIN<1:0> by 1 CLK cycle.

The flip-flop circuit 3 outputs the data POST<1:0>, acquired at a timing in which the clock CLK is switched H→L level, at the timing in which CLK is changed L→H, and supplies the data POST<1:0> as data MAIN<1:0> to the flip-flop circuit 4 and the encoder 5 through the node N4. That is, the data MAIN<1:0> may be data which is acquired by delaying the data POST<1:0> by 1 CLK cycle.

The flip-flop circuit 4 outputs the data MAIN<1:0>, acquired at the timing in which the clock CLK is switched H→L level, at the timing in which CLK is changed L→H, and supplies the data MAIN<1:0> as data PRE<1:0> to the encoder 5. That is, the data PRE<1:0> may be data which is acquired by delaying the data MAIN<1:0> by 1 CLK cycle.

The encoder 5 receives the data POST<1:0> from the flip-flop circuit 2 through the node N3, receives the data MAIN<1:0> from the flip-flop circuit 3 through the node N4, and receives the data PRE<1:0> from the flip-flop circuit 4.

The data PRE<1:0> is data acquired before 1 CLK cycle with respect to the data MAIN<1:0>, and the encoder 5 may adjust an amplitude according to a fact that transition in 2

CLK cycles corresponds to the maximum transition width based on a combination of the data MAIN<1:0> and the data PRE<1:0>.

For example, the encoder 5 may adjust the amplitude for the combination of the data MAIN<1:0> and the data PRE<1:0> according to adjustment information as illustrated in FIG. 3A. FIG. 3A is a table illustrating a data structure of the adjustment information.

When the data MAIN<1:0>=00 and the data PRE<1:0>=11, the encoder 5 assumes that the transition in 2 CLK cycles is transition (that is, a transition of LV4→LV1 illustrated in FIG. 6A) corresponding to the maximum transition width, and supplies control data BOOST_PRE=1 to the DAC 6 while. The control data BOOST_PRE=1 indicates that an amplitude of the data MAIN<1:0> should be changed in a relationship with the data PRE<1:0>.

Otherwise, when the data MAIN<1:0>=11 and the data PRE<1:0>=00, the encoder 5 assumes that the transition in 2 CLK cycles is the transition (that is, a transition of LV1→LV4 illustrated in FIG. 6A) corresponding to the maximum transition width, and supplies the control data BOOST_PRE=1 to the DAC 6.

Otherwise, in cases of other combinations of the data MAIN<1:0> and the data PRE<1:0>, the encoder 5 assumes that the transition in 2 CLK cycles is not the transition corresponding to the maximum transition width, and supplies the control data BOOST_PRE=0 to the DAC 6. The control data BOOST_PRE=0 indicates that the amplitude of the data MAIN<1:0> should not be changed in the relationship with the data PRE<1:0>.

In addition, the data POST<1:0> illustrated in FIG. 2 is data acquired after 1 CLK cycle with respect to the data MAIN<1:0>, and the encoder 5 may adjust the amplitude according to the fact that the transition in 2 CLK cycles corresponds to the maximum transition width based on a combination of the data POST<1:0> and the data MAIN<1:0>.

For example, the encoder 5 may adjust the amplitude for the combination of the data POST<1:0> and the data MAIN<1:0> according to adjustment information as illustrated in FIG. 3B. FIG. 3B is a table illustrating a data structure of the adjustment information.

When the data POST<1:0>=00 and the data MAIN<1:0>=11, the encoder 5 assumes that the transition in 2 CLK cycles is transition (that is, the transition of LV4→LV1 illustrated in FIG. 6A) corresponding to the maximum transition width, and supplies control data BOOST_POST=1 to the DAC 6. The control data BOOST_POST=1 indicates that the amplitude of the data MAIN<1:0> should be changed in the relationship with the data POST<1:0>.

Otherwise, when the data POST<1:0>=11 and the data MAIN<1:0>=00, the encoder 5 assumes that the transition in 2 CLK cycles is transition (that is, the transition of LV1→LV4 illustrated in FIG. 6A) corresponding to the maximum transition width, and supplies the control data BOOST_POST=1 to the DAC 6.

Otherwise, in cases of other combinations of the data POST<1:0> and the data MAIN<1:0>, the encoder 5 assumes that the transition in 2 CLK cycles is not the transition corresponding to the maximum transition width, and supplies control data BOOST_POST=0 to the DAC 6. The control data BOOST_POST=0 indicates that the amplitude of the data MAIN<1:0> should not be changed in the relationship with the data POST<1:0>.

In addition, the encoder 5 supplies the data MAIN<1:0> as data DM<1:0> to the DAC 6.

The DAC 6 performs DA conversion on the data DM<1:0> and generates an output voltage VOUT based on the control data BOOST_PRE and BOOST_POST which are supplied from the encoder 5.

For example, for the DA conversion, the DAC 6 may perform the DA conversion according to conversion information as illustrated in FIG. 4. FIG. 4 is a table illustrating a data structure of the conversion information.

When the data DM<1:0>=00, the control data BOOST_POST=1, and the control data BOOST_PRE=1, the DAC subtracts a modulation component of BOOST_POST and a modulation component of BOOST_PRE from data "00", performs the DA conversion on a result of subtraction, and outputs VOUT=−Vo−2×Vb.

When the data DM<1:0>=00, the control data BOOST_POST=1, and the control data BOOST_PRE=0 or when the data DM<1:0>=00, the control data BOOST_POST=0, and the control data BOOST_PRE=1, the DAC 6 subtracts the modulation component of BOOST_POST from the data "00", performs the DA conversion on a result of subtraction, and outputs VOUT=−Vo−Vb.

When the data DM<1:0>=00, the control data BOOST_POST=0, and the control data BOOST_PRE=0, the DAC 6 performs the DA conversion on the data "00", and outputs VOUT=−Vo.

When the data DM<1:0>=01, the DAC 6 performs the DA conversion on data "01" regardless of values of the control data BOOST_POST and BOOST_PRE, and outputs VOUT=−(⅓)×Vo.

When the data DM<1:0>=10, the DAC 6 performs the DA conversion on data "10" regardless of the values of the control data BOOST_POST and BOOST_PRE, and outputs VOUT=(⅓)×Vo.

When the data DM<1:0>=11, the control data BOOST_POST=0, and the control data BOOST_PRE=0, the DAC 6 performs the DA conversion on data "11", and outputs VOUT=Vo.

When the data DM<1:0>=11, the control data BOOST_POST=0, and the control data BOOST_PRE=1 or when the control data BOOST_POST=1 and the control data BOOST_PRE=0, the DAC 6 adds the modulation component of BOOST_PRE to the data "11", performs the DA conversion on a result of addition, and outputs VOUT=Vo+Vb.

When the data DM<1:0>=11, the control data BOOST_POST=1, and the control data BOOST_PRE=1, the DAC adds the modulation component of BOOST_POST and the modulation component of BOOST_PRE to the data "11", performs the DA conversion on a result of addition, and outputs VOUT=Vo+2×Vb.

Figure 5:
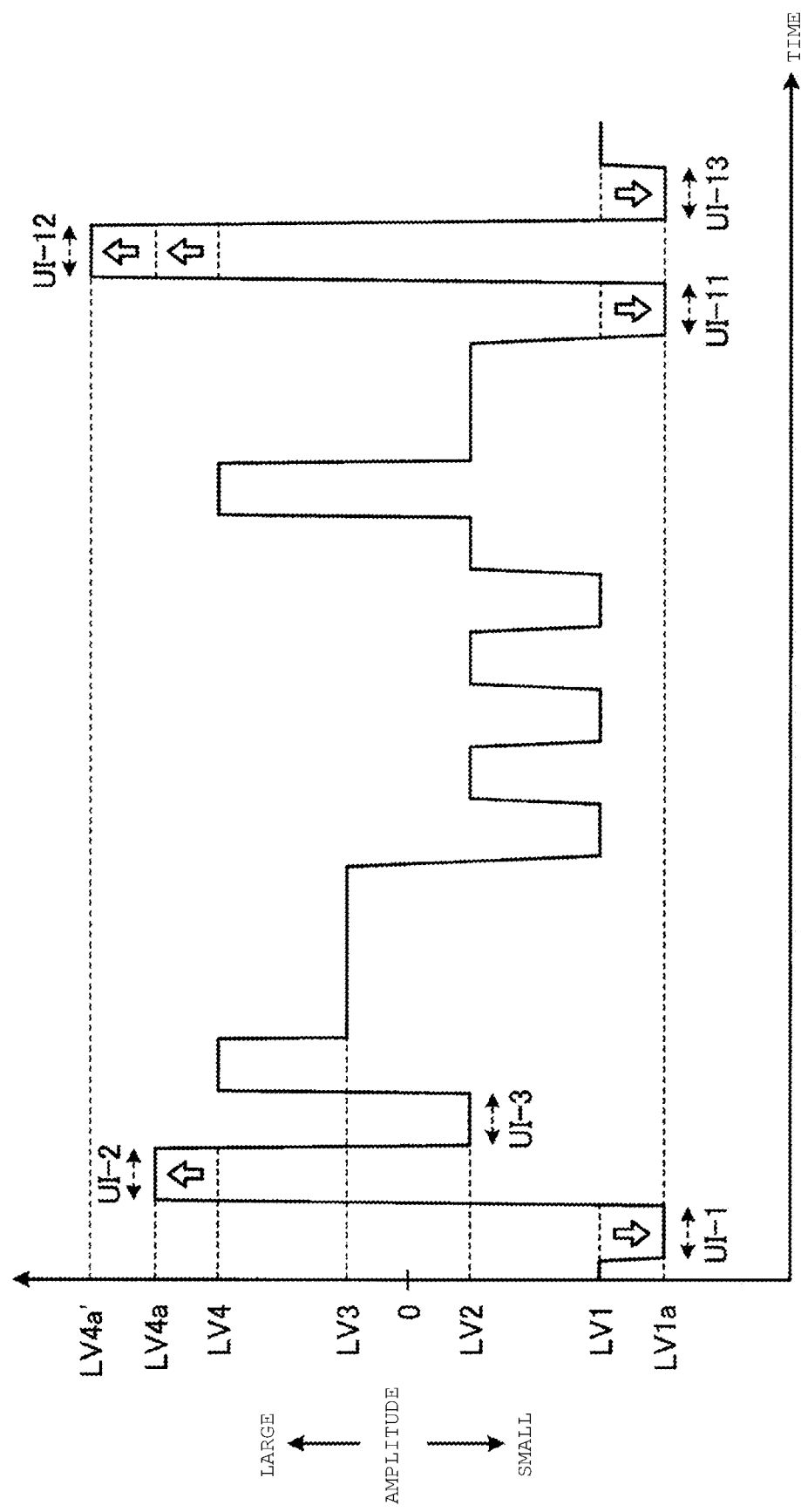
FIG. 5 is a waveform diagram illustrating a transmission signal in the first embodiment.

When the waveform processing illustrated in FIGS. 3A and 3B and FIG. 4 is illustrated in times series, a graph as illustrated in FIG. 5 is acquired. FIG. 5 is a waveform diagram illustrating the transmission signal on which the waveform processing is performed in the waveform processing circuit 1. A period corresponding to 1 symbol of the PAM4 signal is referred to as a Unit Interval (UI). In the examples of FIGS. 2 to 4, 1 cycle of CLK corresponds to 1 UI of the waveform processing. In FIG. 5, the waveform is processed and conveyed for every period corresponding to 1 UI.

For example, in periods UI-1 and UI-2, the transition of the signal level LV1→LV4, that is, the transition corresponding to the maximum transition width is performed, and thus the signal levels LV1 and LV4, which are acquired before and after the transition, are respectively adjusted into LV1a and LV4a. That is, as illustrated using white outlined arrows, the signal level LV1 is lowered to the signal level LV1a and the signal level LV4 is raised to the signal level LV4a.

In periods UI-2 and UI-3, a transition of the signal level LV4→LV2, that is, a transition which does not correspond to the maximum transition width is performed, and thus adjustment is not performed.

In periods UI-11 and UI-12, the transition of the signal level LV1→LV4, that is, the transition corresponding to the maximum transition width is performed, and thus the signal level LV1, which is acquired before the transition, is adjusted to LV1a. That is, as illustrated using white outlined arrows, the signal level LV1 is lowered to the signal level LV1a.

In periods UI-11, UI-12, and UI-13, the transitions of the signal level LV1→LV4 and LV4→LV1, that is, two transitions corresponding to the maximum transition width are successively performed, and thus the signal level LV4, which is acquired before and after the transition, is adjusted to LV4a'. That is, as illustrated using white outlined arrows, the signal level LV4 is raised to the signal level LV4a and the signal level LV4a is further raised to the signal level LV4a'.

In the periods UI-12 and UI-13, the transition of the signal level LV4→LV1, that is, the transition corresponding to the maximum transition width is performed, and thus the signal level LV1, which is acquired after the transition, is adjusted to LV1a. That is, as illustrated using white outlined arrows, the signal level LV1 is lowered to the signal level LV1a.

Figure 6B:
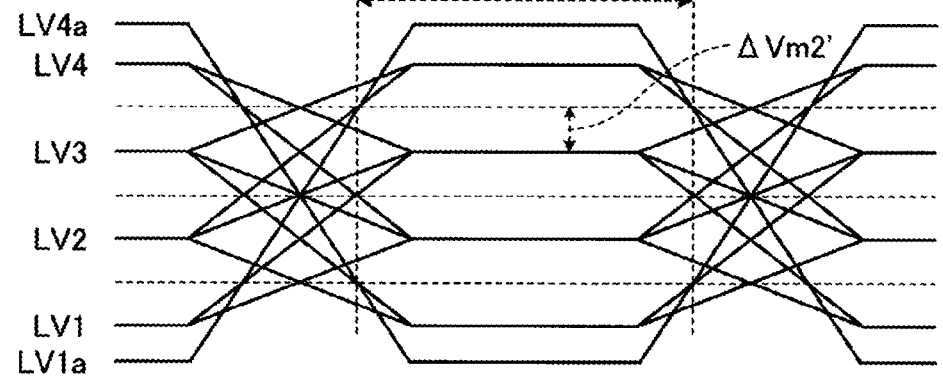

When viewed for the amplitude margin and the time margin, patterns as illustrated in FIGS. 6A and 6B are acquired. FIG. 6A illustrates the eye pattern of the transmission signal before the waveform is adjusted, and FIG. 6B illustrates the eye pattern of the transmission signal after the waveform is adjusted.

In FIG. 6A, which illustrates a state acquired before the adjustment is performed, when a signal level determination threshold voltage between the signal level LV3 and the signal level LV4 is set and the time margin and the amplitude margin are secured, any of the time margin and the amplitude margin is sacrificed. That is, when the signal level determination threshold voltage is set to an intermediate level between the signal level LV3 and the signal level LV4 in order to secure an amplitude margin ΔVm2, the time margin is sacrificed and narrows to ΔTm2. When the signal level determination threshold voltage is set on a side of the signal level LV3 rather than the intermediate level between the signal level LV3 and the signal level LV4 in order to secure the time margin ΔTm1, the amplitude margin is sacrificed and narrows to ΔVm1.

In contrast, in FIG. 6B, which illustrates a state acquired after the adjustment is performed, it is possible to compatibly secure both the time margin and the amplitude margin. That is, it is possible to secure time margin ΔTm1' corresponding to the time margin ΔTm1 while securing an amplitude margin ΔVm2' corresponding to the amplitude margin ΔVm2.

Although not illustrated in the drawings, it is easily understood by those skilled in the art that the eye pattern of the reception signal in the reception apparatus 300 which receives the transmission signal, which is adjusted as described above, through the wired transmission path 200, shows a similar tendency.

As described above, in the first embodiment, when the transition, which corresponds to the maximum transition width, between the signal levels is detected in the transmission apparatus 100, the transmission signal is generated by changing the amplitudes of the signal levels before and after the transition. Therefore, it is possible to compatibly secure the amplitude margin and the time margin in the reception apparatus 300 which receives the transmission signal.

When the waveform diagram of FIG. 5 is viewed, amplitude adjustment between the periods UI-11 and UI-12 overlap amplitude adjustment between the periods UI-12 and UI-13, and thus an adjustment width of an amplitude in the period UI-12 is approximately double of adjustment widths in other periods UI-1, UI-2, UI-11, and UI-13 on which the amplitude adjustment is performed. For example, when a period, during which the amplitude adjustment is performed, is set to 0.5 UI (the half of a period corresponding to 1 symbol of the PAM signal), it is expected that it is possible to prevent overlap between the amplitude adjustment.

Figure 7:
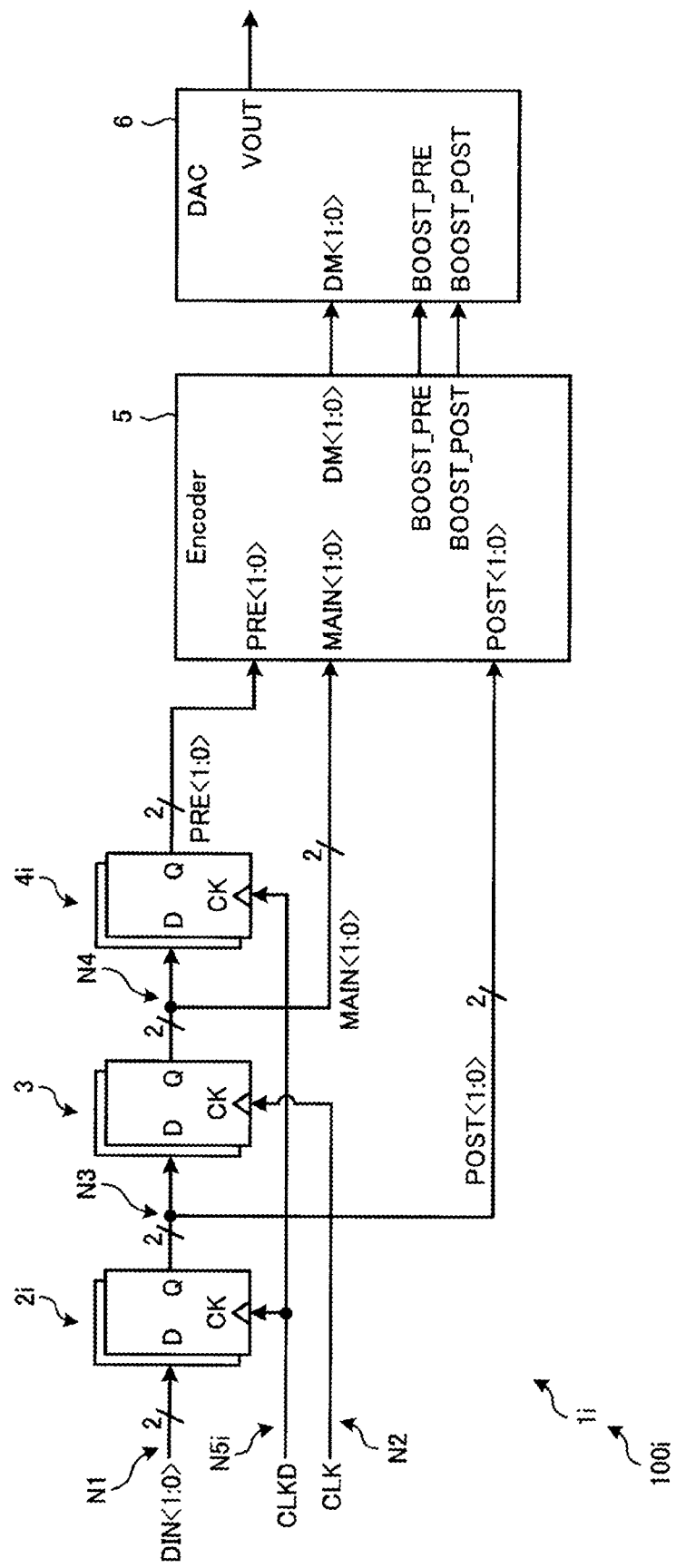
FIG. 7 is a diagram illustrating a configuration of a waveform processing circuit according to a modification example of the first embodiment.

Based on these ideas, in a modification example of the first embodiment, it is possible to form a transmission apparatus 100i including a waveform processing circuit 1i as illustrated in FIG. 7. FIG. 7 is a diagram illustrating a configuration of the waveform processing circuit 1i according to the modification example of the first embodiment.

In a transmission apparatus 100i, the waveform processing circuit 1i includes flip-flop circuits 2i and 4i instead of the flip-flop circuits 2 and 4 (refer to FIG. 2). Each of the flip-flop circuits 2i and 4i includes a clock terminal CK which is electrically connected to a node N5i. A clock CLKD is supplied to the node N5i from a clock generation circuit (not illustrated in the drawing).

Figure 8:
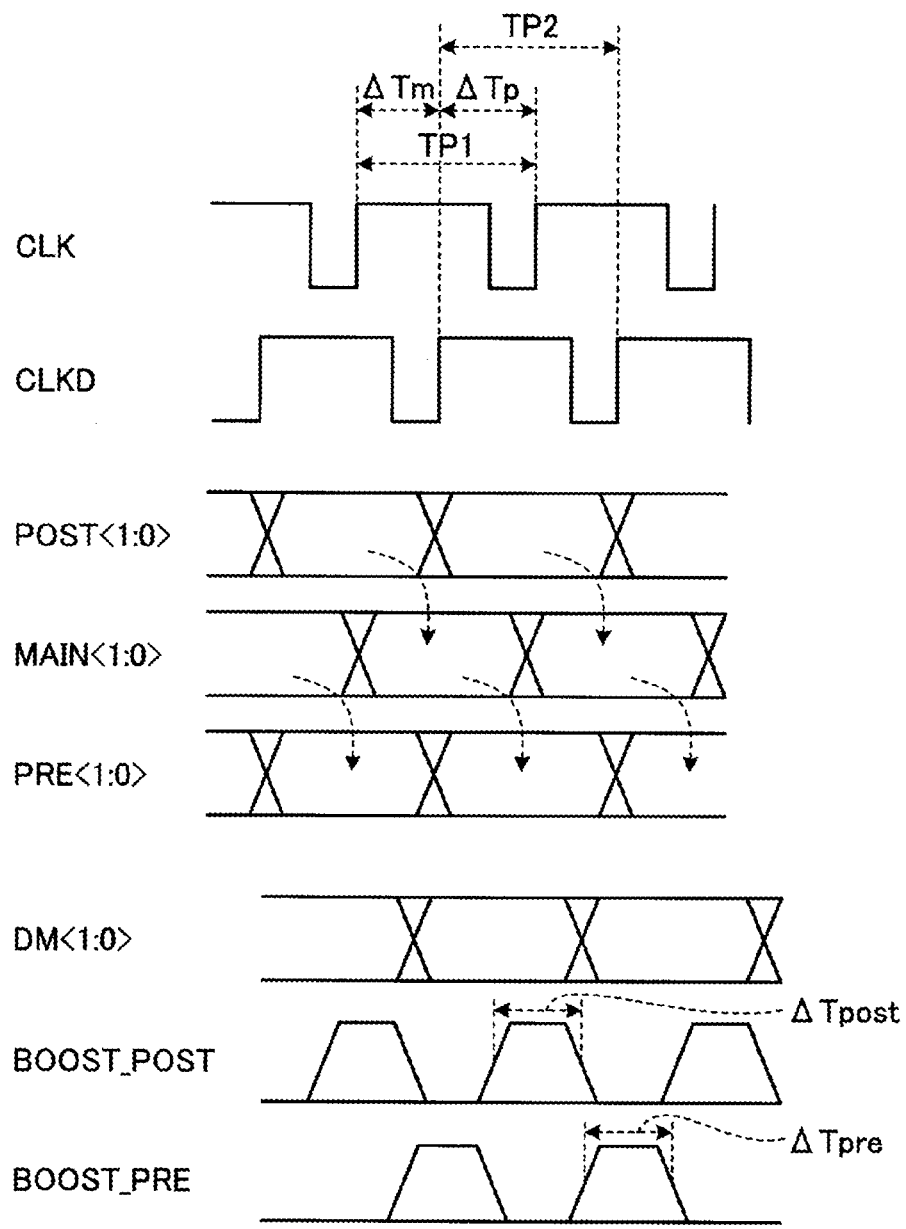
FIG. 8 is a waveform diagram illustrating an operation of the waveform processing circuit according to the modification example of the first embodiment.

As illustrated in FIG. 8, here, a signal with a duty of approximately 75% is used as the clock CLK and the clock CLKD. The clock CLKD is a clock acquired by delaying the clock CLK by a half cycle. FIG. 8 is a waveform diagram illustrating an operation of the waveform processing circuit 1i. The flip-flop circuits 2i, 3, and 4i are connected in series, are configured to alternately receive the clock CLK and the clock CLKD, and may form a delay chain in which delay stages having a half cycle of CLK are connected in series. Outputs of the respective flip-flop circuits 2i, 3, and 4i are electrically connected to the encoder 5, and the encoder 5 may receive data in which the delay amounts are different from each other for every half of the CLK cycle.

For example, at a point of time of reception in the node N1, the data POST<1:0> is data acquired after 1 CLK cycle with respect to the data MAIN<1:0>. However, as illustrated in FIG. 7, the transmission apparatus 100i includes the waveform processing circuit 1i. The waveform processing circuit 1i is configured to receive a modulated signal indicating each of values of pulses by one of four signal levels including a first signal level, a second signal level higher than the first signal level, a third signal level higher than the second signal level, and a fourth signal level higher than the third signal level. The waveform processing circuit 1i is configured to output a signal corresponding to the modulate signal. A portion of the output signal corresponding to a portion of the modulated signal transitioning between the first and fourth signal levels transitions between a first adjusted signal level different from the first signal level and a second adjusted signal level different from the fourth signal level.

The transmission apparatus is configured to transmit a signal corresponding to the signal output from the waveform processing circuit 1i through a wired transmission path 200. As illustrated in FIG. 8, the encoder 5 may receive the data POST<1:0> and the data MAIN<1:0> with a time lag ΔTpm corresponding to an approximately half CLK cycle. The encoder 5 may adjust the amplitude according to a fact that the transition in 1 CLK cycle corresponds to the maximum transition width in units of the approximately half CLK cycle based on the combination of the data POST<1:0> and the data MAIN<1:0>. For example, the encoder 5 may generate the control data BOOST_POST=1 with a pulse corresponding to an approximately half CLK cycle width ΔTpost according to the fact that a transition in 1 CLK cycle TP1 corresponds to the maximum transition width, and may supply the control data BOOST_POST=1 to the DAC 6 based on the combination of the data POST<1:0> and the data MAIN<1:0>.

Otherwise, at the point of time of reception in the node N1, the data PRE<1:0> is data acquired before 1 CLK cycle with respect to the data MAIN<1:0>. However, as illustrated in FIG. 8, the encoder 5 may receive the data MAIN<1:0> and the data PRE<1:0> with a time lag ΔTp corresponding to the approximately half CLK cycle. The encoder 5 may adjust the amplitude according to the fact that the transition in 1 CLK cycle corresponds to the maximum transition width in units of the approximately half CLK cycle based on the combination of the data MAIN<1:0> and the data PRE<1:0>. For example, the encoder 5 may generate the control data BOOST_PRE=1 with a pulse corresponding to an approximately half CLK cycle width ΔTpre according to a fact that a transition in 1 CLK cycle TP2 corresponds to the maximum transition width, and may supply the control data BOOST_PRE=1 to the DAC 6 based on the combination of the data MAIN<1:0> and the data PRE<1:0>.

Therefore, for the DA conversion, the DAC 6 may perform the DA conversion according to conversion information as illustrated in FIG. 9. FIG. 9 is a diagram illustrating a data structure of the conversion information. Description of parts, which are the same as in FIG. 4, will not be repeated.

When the data DM<1:0>=00 and the control data BOOST_POST=1, the DAC 6 subtracts the modulation component of BOOST_POST from the data "00" regardless of a value of the control data BOOST_PRE, performs the DA conversion on a result of subtraction, and outputs VOUT=−Vo−Vb.

When the data DM<1:0>=00 and the control data BOOST_PRE=1, the DAC 6 subtracts the modulation component of BOOST_PRE from the data "00" regardless of a value of the control data BOOST_POST, performs the DA conversion on a result of subtraction, and outputs VOUT=−Vo−Vb.

When the data DM<1:0>=11 and the control data BOOST_POST=1, the DAC 6 adds the modulation component of BOOST_POST to the data "11" regardless of the value of the control data BOOST_PRE, performs the DA conversion on a result of addition, and outputs VOUT=Vo+Vb.

When the data DM<1:0>=11 and the control data BOOST_PRE=1, the DAC 6 adds the modulation component of BOOST_PRE to the data "11" regardless of the value of the control data BOOST_POST, performs the DA conversion on a result of addition, and outputs VOUT=Vo+Vb.

Figure 10:
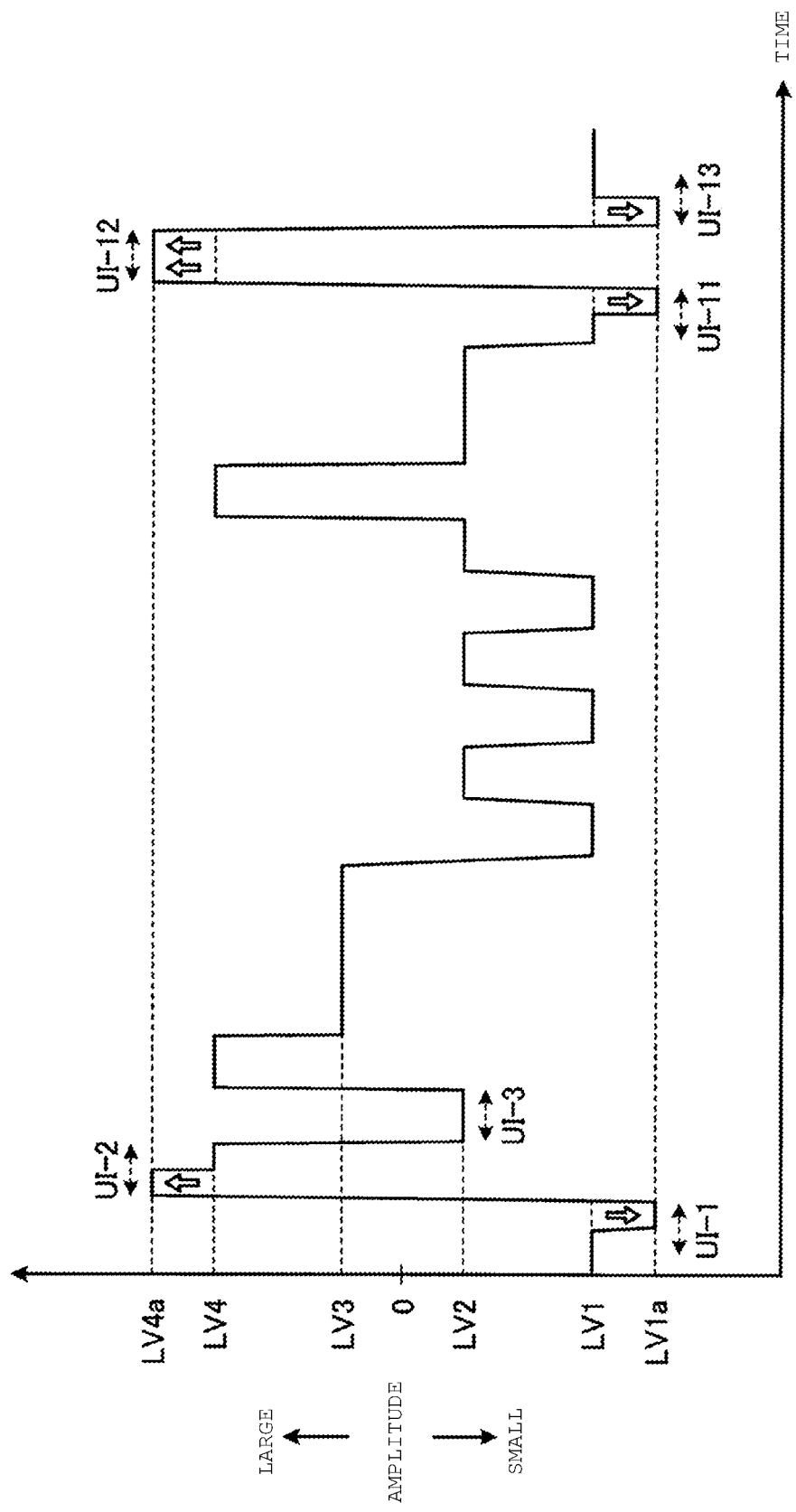
FIG. 10 is a waveform diagram illustrating a transmission signal in the modification example of the first embodiment.
Figure 11:
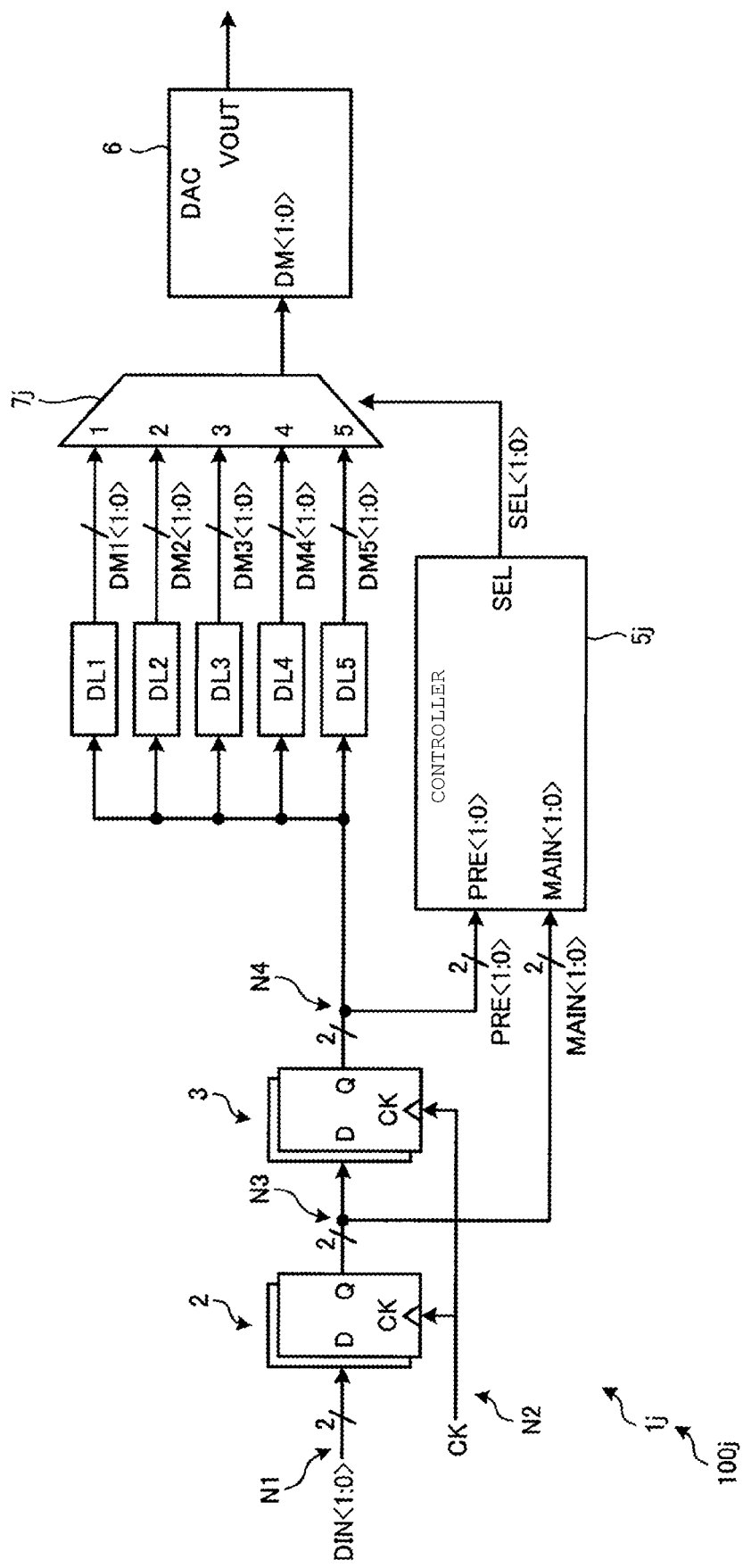
FIG. 11 is a diagram illustrating a configuration of a waveform processing circuit according to a second embodiment.

When the waveform processing is performed in time series, a signal illustrated in FIG. 10 is acquired. FIG. 10 is a waveform diagram illustrating a transmission signal on which the waveform processing is performed in the waveform processing circuit 1i.

For example, in the periods UI-1 and UI-2, the transition of the signal level LV1→LV4, that is, the transition corresponding to the maximum transition width is performed, and thus a latter half signal level LV1 in the period UI-1 and a first half signal level LV4 in the period UI-2 are respectively adjusted to LV1a and LV4a. That is, as illustrated using white outlined arrows, the latter half signal level LV1 in the period UI-1 is lowered to the signal level LV1a, and the first half signal level LV4 in the period UI-2 is raised to the signal level LV4a.

In the periods UI-2 and UI-3, the transition of the signal level LV4→LV2, that is, the transition which does not correspond to the maximum transition width is performed, and thus the adjustment is not performed.

In the periods UI-11 and UI-12, the transition of the signal level LV1→LV4, that is, the transition corresponding to the maximum transition width is performed, and thus the latter half signal level LV1 in the period UI-11 and the first half signal level LV4 in the period UI-12 are respectively adjusted to LV1a and LV4a. That is, as illustrated using white outlined arrows, the latter half signal level LV1 in the period UI-11 is lowered to the signal level LV1a and the first half signal level LV4 in the period UI-12 is raised to the signal level LV4a.

In the periods UI-12 and UI-13, the transition of the signal level LV4→LV1, that is, the transition corresponding to the maximum transition width is performed, and thus the latter half signal level LV4 in the period UI-12 and the first half signal level LV1 in the period UI-13 are respectively adjusted to LV4a' and LV1a. That is, as illustrated using white outlined arrows, the latter half signal level LV4a in the period UI-12 is raised to the signal level LV4a, and the first half signal level LV1 in the period UI-13 is lowered to the signal level LV1a. Therefore, it is possible to prevent overlapped adjustment unlike the period UI-12 of FIG. 5.

As described above, according to the first embodiment, when the period in which the amplitude adjustment is performed is set to 0.5 UI (the half of the period corresponding to 1 symbol of the PAM4 signal), it is possible to prevent the overlap between the amplitude adjustment and it is possible to cause the adjustment width to be equivalent in each amplitude adjustment.

Second Embodiment

A transmission apparatus 100j according to a second embodiment will be described. Hereinafter, parts which are different from the first embodiment will be mainly described.

In the first embodiment, the amplitude is adjusted through the waveform processing performed by the transmission apparatus 100 or the transmission apparatus 100i. However, in the second embodiment, a phase is adjusted through waveform processing performed by the transmission apparatus 100j.

Specifically, the transmission apparatus 100j includes a waveform processing circuit 1j instead of the waveform processing circuit 1 (refer to FIG. 2) or the waveform processing circuit 1i (refer to FIG. 7). When transition between the signal level LV1 or the signal level LV4 and the signal level LV2 or the signal level LV3 is detected, the waveform processing circuit 1j changes phases of the signal levels acquired before and after the detected transition.

For example, the waveform processing circuit 1j changes (for example, causes the phase to lag) timing at which transition from the signal level LV2 to the signal level LV1 or the signal level LV4 starts. In addition, the waveform processing circuit 1j changes (for example, causes the phase to advance) timing at which transition from the signal level LV1 or the signal level LV4 to the signal level LV2 is completed. The waveform processing circuit 1j changes (for example, causes the phase to lag) timing at which transition from the signal level LV3 to the signal level LV1 or the signal level LV4 starts. The waveform processing circuit 1*j* changes (for example, causes the phase to advance) timing at which transition from the signal level LV1 or the signal level LV4 to the signal level LV3 is completed.

The waveform processing circuit 1*j* does not change the phases of LV1→LV4, LV4→LV1, LV2→LV3, and LV3→LV2 and uses the phases as reference.

More specifically, the waveform processing circuit 1*j* does not include the flip-flop circuit 4 and the encoder 5 (refer to FIG. 2), and further includes a controller 5*j*, a plurality of delay elements DL1, DL2, DL3, DL4, and DL5, and a selector 7*j*. The plurality of delay elements DL1, DL2, DL3, DL4, and DL5 are electrically connected between the node N4 and the selector 7*j* in parallel with each other. The plurality of delay elements DL1, DL2, DL3, DL4, and DL5 include respectively different delay amounts. When the delay amounts of the delay elements DL1, DL2, DL3, DL4, and DL5 are respectively set to D1, D2, D3, D4, and D5, the following Equation 1 is established.

$$D1 < D2 < D3 < D4 < D5 \qquad \text{Equation 1}$$

It is possible to set the delay amounts D1, D2, D3, D4, and D5 to the delay amounts corresponding to, for example, phase adjustment amounts −70 deg, −19 deg, 0 deg, 19 deg, and 70 deg.

Each of the flip-flop circuits 2 and 3 is, for example, a two-bit flip-flop circuit. The flip-flop circuits 2 and 3 are connected in series, are configured to receive the common clock CLK, and may form a delay chain in which delay stages having the CLK cycle are connected in series. Outputs of the respective flip-flop circuits 2 and 3 are electrically connected to the controller 5*j*, and the controller 5*j* may receive data in which the delay amounts are different from each other.

The controller 5*j* receives the data MAIN<1:0> from the flip-flop circuit 2 through the node N3, and receives the data PRE<1:0> from the flip-flop circuit 3 through the node N4.

Figure 12:
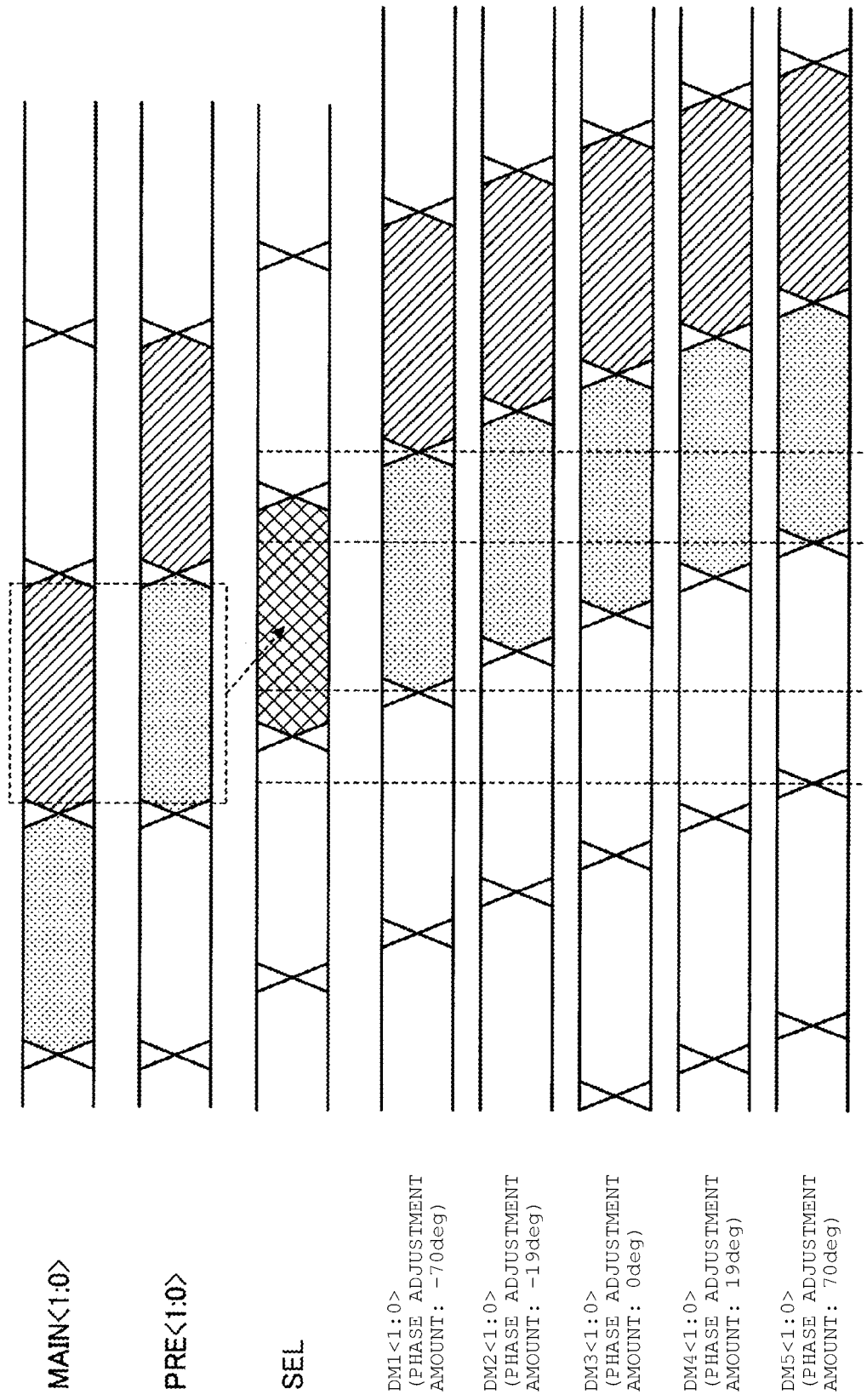
FIG. 12 is a waveform diagram illustrating an operation of the waveform processing circuit according to the second embodiment.

The data MAIN<1:0> is data acquired after 1 CLK cycle with respect to the data PRE<1:0>. Based on the combination of the data MAIN<1:0> and the data PRE<1:0>, the controller 5*j* may generate control data SEL<1:0>, may supply the control data SEL<1:0> to the selector 7*j*, and may adjust the phase, as illustrated in FIG. 12. FIG. 12 is a waveform diagram illustrating an operation of the waveform processing circuit 1*j*. FIG. 12 illustrates the phase adjustment amounts based on a phase of DM3.

For example, for the combination of the data PRE<1:0> and the data MAIN<1:0>, the controller 5*j* may adjust the phase according to adjustment information as illustrated in FIG. 13. FIG. 13 is a diagram illustrating a data structure of the adjustment information.

For example, when the data PRE<1:0>=00 and the data MAIN<1:0>=00, the controller 5*j* sets the transition in 2 CLK cycles to a reference transition, and supplies the control data SEL<1:0>=3 corresponding to the phase adjustment amount 0 deg to the selector 7*j*. Therefore, the selector 7*j* supplies data DM3<1:0>, which passes through the delay element DL3 from the node N4, to the DAC 6.

The process is performed on a combination of (data PRE<1:0>, data MAIN<1:0>)=(00, 11), (01, 01), (01, 10), (10, 01), (10, 10), (11, 00), (11, 11) in the same manner.

When the data PRE<1:0>=00 and the data MAIN<1:0>=01, the controller 5*j* sets the transition in 2 CLK cycles as a transition whose phase should be advanced, and supplies the control data SEL<1:0>=1 corresponding to a phase adjustment amount of −70 deg to the selector 7*j*. Therefore, the selector 7*j* supplies data DM1<1:0>, which passes through the delay elements DL1 from the node N4, to the DAC 6.

The process is performed on a combination of (data PRE<1:0>, data MAIN<1:0>)=(11, 10) in the same manner.

When the data PRE<1:0>=00 and the data MAIN<1:0>=10, the controller 5*j* sets the transition in 2 CLK cycles as the transition whose phase should be advanced, and supplies control data SEL<1:0>=2 corresponding to a phase adjustment amount of −19 deg to the selector 7*j*. Therefore, the selector 7*j* supplies data DM2<1:0>, which passes through the delay elements DL2 from the node N4, to the DAC 6.

The process is performed on a combination of (data PRE<1:0>, data MAIN<1:0>)=(11, 01) in the same manner.

When the data PRE<1:0>=01 and the data MAIN<1:0>=11, the controller 5*j* sets the transition in 2 CLK cycles as a transition whose phase should lag, and supplies control data SEL<1:0>=4 corresponding to a phase adjustment amount of 19 deg to the selector 7*j*. Therefore, the selector 7*j* supplies data DM4<1:0>, which passes through the delay elements DL4 from the node N4, to the DAC 6.

The process is performed on a combination of (data PRE<1:0>, data MAIN<1:0>)=(10, 00) in the same manner.

When the data PRE<1:0>=10 and the data MAIN<1:0>=11, the controller 5*j* sets the transition in 2 CLK cycles as the transition whose phase should lag, and supplies control data SEL<1:0>=5 corresponding to a phase adjustment amount of 70 deg to the selector 7*j*. Therefore, the selector 7*j* supplies data DM5<1:0>, which passes through the delay elements DL5 from the node N4, to the DAC 6.

The process is performed on a combination of (data PRE<1:0>, data MAIN<1:0>)=(01, 00) in the same manner.

The DAC 6 performs the DA conversion while setting the data supplied from the selector 7*j* as the data DM<1:0>, and outputs the output voltage VOUT.

For example, for the DA conversion, the DAC 6 may perform the DA conversion according to conversion information as illustrated in FIG. 14. FIG. 14 is a diagram illustrating a data structure of the conversion information.

When the data DM<1:0>=00, the DAC 6 performs the DA conversion on the data "00", and outputs VOUT=−Vo.

When the data DM<1:0>=01, the DAC 6 performs the DA conversion on the data "01" and outputs VOUT=−(⅓)× Vo.

When the data DM<1:0>=10, the DAC 6 performs the DA conversion on the data "01", and outputs VOUT=(⅓)× Vo.

When the data DM<1:0>=11, the DAC 6 performs the DA conversion on the data "00", and outputs VOUT=Vo. That is, the amplitude is the same (is not changed) as when the phase adjustment is not performed.

When viewed for the time margin, patterns in FIGS. 15A and 15B are acquired. FIG. 15A illustrates an eye pattern of the transmission signal acquired before the adjustment, and FIG. 15B illustrates an eye pattern of the transmission signal acquired after the adjustment.

It is understood that it is possible to acquire a wider time margin ΔTm12 in the eye pattern acquired after the adjustment, which is illustrated in FIG. 15B, than a time margin ΔTm11 in the eye pattern acquired before the adjustment, which is illustrated in FIG. 15A.

As described above, according to the second embodiment, when the transition between the maximum or minimum signal level LV1, LV4 and the intermediate signal levels LV2 and LV3 is detected in the transmission apparatus 100*j*, a phase of the signal level acquired after the transition is changed, and the transmission signal is generated. Therefore, it is possible to easily secure the time margin in the reception apparatus 300 which receives the transmission signal.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transmission apparatus comprising:
a waveform processing circuit configured to:
receive a modulated signal indicating each of values of pulses by one of four signal levels including a first signal level, a second signal level higher than the first signal level, a third signal level higher than the second signal level, and a fourth signal level higher than the third signal level; and
output a signal corresponding to the modulated signal, wherein a portion of the output signal corresponding to a portion of the modulated signal that transitions between the first and fourth signal levels, transitions between a first adjusted signal level different from the first signal level and a second adjusted signal level different from the fourth signal level,
wherein the transmission apparatus is configured to transmit a signal corresponding to the signal output from the waveform processing circuit through a wired communication path.

2. The transmission apparatus according to claim 1, wherein the first adjusted signal level is lower than the first signal level, and the second adjusted signal level is higher than the fourth signal level.

3. The transmission apparatus according to claim 2, wherein
when three consecutive pulses of the modulated signal are at first, fourth, and first signal levels, respectively, corresponding consecutive pulses of the output signal are at the first adjusted signal level, a third adjusted signal level, and the first adjusted signal level, respectively, the third adjusted signal level being higher than the second adjusted signal level.

4. The transmission apparatus according to claim 1, wherein a portion of the output signal corresponding to a portion of the modulated signal that transitions between the second and third signal levels transitions between the second and third signal levels.

5. The transmission apparatus according to claim 1, wherein the portion of the output signal is entirety of two consecutive pulses thereof.

6. The transmission apparatus according to claim 1, wherein the portion of the output signal includes a last part of a first pulse and a starting part of a second pulse immediately following the first pulse.

7. The transmission apparatus according to claim 6, wherein the portion of the output signal further includes a last part of the second pulse that is at an unadjusted signal level, and a third pulse of the output signal immediately following the second pulse is at the second or third signal level.

8. The transmission apparatus according to claim 6, wherein the last part of the first pulse is a last half of the first pulse, and the starting part of the second pulse is a starting half of the second pulse.

9. The transmission apparatus according to claim 1, wherein the output signal includes no phase shift of pulses with respect to the modulated signal.

10. The transmission apparatus according to claim 1, wherein the modulated signal is a pulse amplitude modulation 4 (PAM4) signal.

11. A communication system comprising:
the transmission apparatus according to claim 1; and
a reception apparatus connected to the transmission apparatus through the wired communication path.

12. A transmission apparatus comprising:
a waveform processing circuit configured to:
receive a modulated signal indicating each of values of pulses by one of four signal levels including a first signal level, a second signal level higher than the first signal level, a third signal level higher than the second signal level, and a fourth signal level higher than the third signal level; and
output a signal corresponding to the modulated signal, wherein a portion of the output signal that transitions between one among the four signal levels and another among the four signal levels, is phase-shifted with respect to a corresponding portion of the modulated signal,
wherein the transmission apparatus is configured to transmit a signal corresponding to the signal output from the waveform processing circuit through a wired communication path.

13. The transmission apparatus according to claim 12, wherein
a first portion of the portion of the output signal transitions between the first and second signal levels.

14. The transmission apparatus according to claim 12, wherein
a second portion of the portion of the output signal transitions between the second and fourth signal levels.

15. The transmission apparatus according to claim 12, wherein
a third portion of the portion of the output signal transitions between the first and third signal levels.

16. The transmission apparatus according to claim 12, wherein
a fourth portion of the portion of the output signal transitions between the third and fourth signal levels.

17. The transmission apparatus according to claim 12, wherein
another portion of the output signal that transitions between the first and fourth signal levels is not phase-shifted with respect to a corresponding portion of the modulated signal.

18. The transmission apparatus according to claim 12, wherein
another portion of the output signal that transitions between the second and third signal levels is not phase-shifted with respect to a corresponding portion of the modulated signal.

19. The transmission apparatus according to claim 12, wherein the output signal includes no adjustment of signal levels with respect to the modulated signal.

20. A communication system comprising:
the transmission apparatus according to claim 12; and
a reception apparatus connected to the transmission apparatus through the wired communication path.

* * * * *